(12) United States Patent
Alam et al.

(10) Patent No.: US 11,792,123 B2
(45) Date of Patent: Oct. 17, 2023

(54) CONCEPT FOR A SOURCE DEVICE AND A DESTINATION DEVICE OF A POINT-TO-MULTIPOINT COMMUNICATION NETWORK

(71) Applicant: Intel Corporation, Santa Clara, CA (US)

(72) Inventors: Naveed Alam, Bangalore (IN); Dhruba Deka, Bangalore (IN); Ravindra Singh, Bangalore (IN)

(73) Assignee: Intel Corporation, Santa Clara, CA (US)

( * ) Notice: Subject to any disclaimer, the term of this patent is extended or adjusted under 35 U.S.C. 154(b) by 205 days.

(21) Appl. No.: 17/209,152

(22) Filed: Mar. 22, 2021

(65) Prior Publication Data

US 2021/0328919 A1     Oct. 21, 2021

(51) Int. Cl.
*H04B 10/00* (2013.01)
*H04L 45/00* (2022.01)
(Continued)

(52) U.S. Cl.
CPC ............ *H04L 45/72* (2013.01); *H04B 10/27* (2013.01); *H04L 1/004* (2013.01); *H04L 12/18* (2013.01)

(58) Field of Classification Search
CPC ........ H04B 10/272; H04J 14/08; H04J 14/086
See application file for complete search history.

(56) References Cited

U.S. PATENT DOCUMENTS

| | | | |
|---|---|---|---|
| 2012/0093509 A1* | 4/2012 | Kazawa | H04J 14/0246 398/58 |
| 2014/0233950 A1* | 8/2014 | Luo | H04Q 11/0067 398/66 |
| 2018/0077475 A1* | 3/2018 | Ye | H04J 14/00 |

FOREIGN PATENT DOCUMENTS

WO    2018162947 A1    9/2018

OTHER PUBLICATIONS

International Telecommunication Union: Series G: Transmission systems and media, digital systems and networks, Digital sections and digital line system—Optical line systems for local and access networks, 10-Gigabit-capable passive optical networks (XG-PON): Transmission convergence (TC) layer specification, ITU-T G.987.3 (Jan. 2014), pp. 1-146.

(Continued)

*Primary Examiner* — Daniel G Dobson
(74) *Attorney, Agent, or Firm* — 2SPL Patent Attorneys PartG mbB

(57) ABSTRACT

Examples relate to a transmission apparatus, transmission device, transmission method and computer program for a source device, and to a reception apparatus, reception device, reception method and computer program for a destination device. The transmission apparatus is suitable for generating a header of a transmission frame to be transmitted downstream from a source device to a plurality of destination devices via a point to multipoint communication network. The transmission apparatus comprises processing circuitry configured to generate the header based on a plurality data units to be transmitted to the destination devices. Each data unit is designated to be transmitted to one of the destination devices. The processing circuitry wherein the header is generated such, that the header comprises, for each destination device, information on a presence of data (Continued)

for the destination device in the transmission frame associated with the header.

24 Claims, 10 Drawing Sheets

(51) Int. Cl.
  *H04L 12/18* (2006.01)
  *H04L 1/00* (2006.01)
  *H04B 10/27* (2013.01)
  *H04J 14/00* (2006.01)

(56) References Cited

OTHER PUBLICATIONS

International Telecommunication Union, Telecommunication Standardization Sector: "Higher Speed Passive Optical Networks: Common Transmission Convergence Layer Specification", SG15, Study Group 15, Rec.ITU-T G.hsp.comTC, Feb. 17, 2020, pp. 1-115.
LAN/MAN Standards Committee of the IEEE Computer Society: Draft Standard for Ethernet, Amendment: Physical Layer Specifications and Management Parameters for 25 GB/s and 50 GB/s Passive Optical Networks, IEEE P802.3caTM/D3.1, Jan. 22, 2020.

* cited by examiner

CONCEPT FOR A SOURCE DEVICE AND A DESTINATION DEVICE OF A POINT-TO-MULTIPOINT COMMUNICATION NETWORK

FIELD

Examples relate to a transmission apparatus, transmission device, transmission method and computer program for a source device, and to a reception apparatus, reception device, reception method and computer program for a destination device.

BACKGROUND

Passive Optical Network (PON) is a telecommunication technology that is used for delivering broadband internet access to end customers, using fiber-optics as medium of communication.

BRIEF DESCRIPTION OF THE FIGURES

Some examples of apparatuses and/or methods will be described in the following by way of example only, and with reference to the accompanying figures, in which.

DETAILED DESCRIPTION

Various examples will now be described more fully with reference to the accompanying drawings in which some examples are illustrated. In the figures, the thicknesses of lines, layers and/or regions may be exaggerated for clarity.

Accordingly, while further examples are capable of various modifications and alternative forms, some particular examples thereof are shown in the figures and will subsequently be described in detail. However, this detailed description does not limit further examples to the particular forms described. Further examples may cover all modifications, equivalents, and alternatives falling within the scope of the disclosure. Same or like numbers refer to like or similar elements throughout the description of the figures, which may be implemented identically or in modified form when compared to one another while providing for the same or a similar functionality.

It will be understood that when an element is referred to as being "connected" or "coupled" to another element, the elements may be directly connected or coupled via one or more intervening elements. If two elements A and B are combined using an "or", this is to be understood to disclose all possible combinations, i.e. only A, only B as well as A and B, if not explicitly or implicitly defined otherwise. An alternative wording for the same combinations is "at least one of A and B" or "A and/or B". The same applies, mutatis mutandis, for combinations of more than two Elements.

The terminology used herein for the purpose of describing particular examples is not intended to be limiting for further examples. Whenever a singular form such as "a," "an" and "the" is used and using only a single element is neither explicitly or implicitly defined as being mandatory, further examples may also use plural elements to implement the same functionality. Likewise, when a functionality is subsequently described as being implemented using multiple elements, further examples may implement the same functionality using a single element or processing entity. It will be further understood that the terms "comprises," "comprising," "includes" and/or "including," when used, specify the presence of the stated features, integers, steps, operations, processes, acts, elements and/or components, but do not preclude the presence or addition of one or more other features, integers, steps, operations, processes, acts, elements, components and/or any group thereof.

Unless otherwise defined, all terms (including technical and scientific terms) are used herein in their ordinary meaning of the art to which the examples belong.

Examples of the present disclosure relate to methods for improving or optimizing Power Consumption in PON ONUs (Passive Optical Network Optical Network Units).

Figure 1:
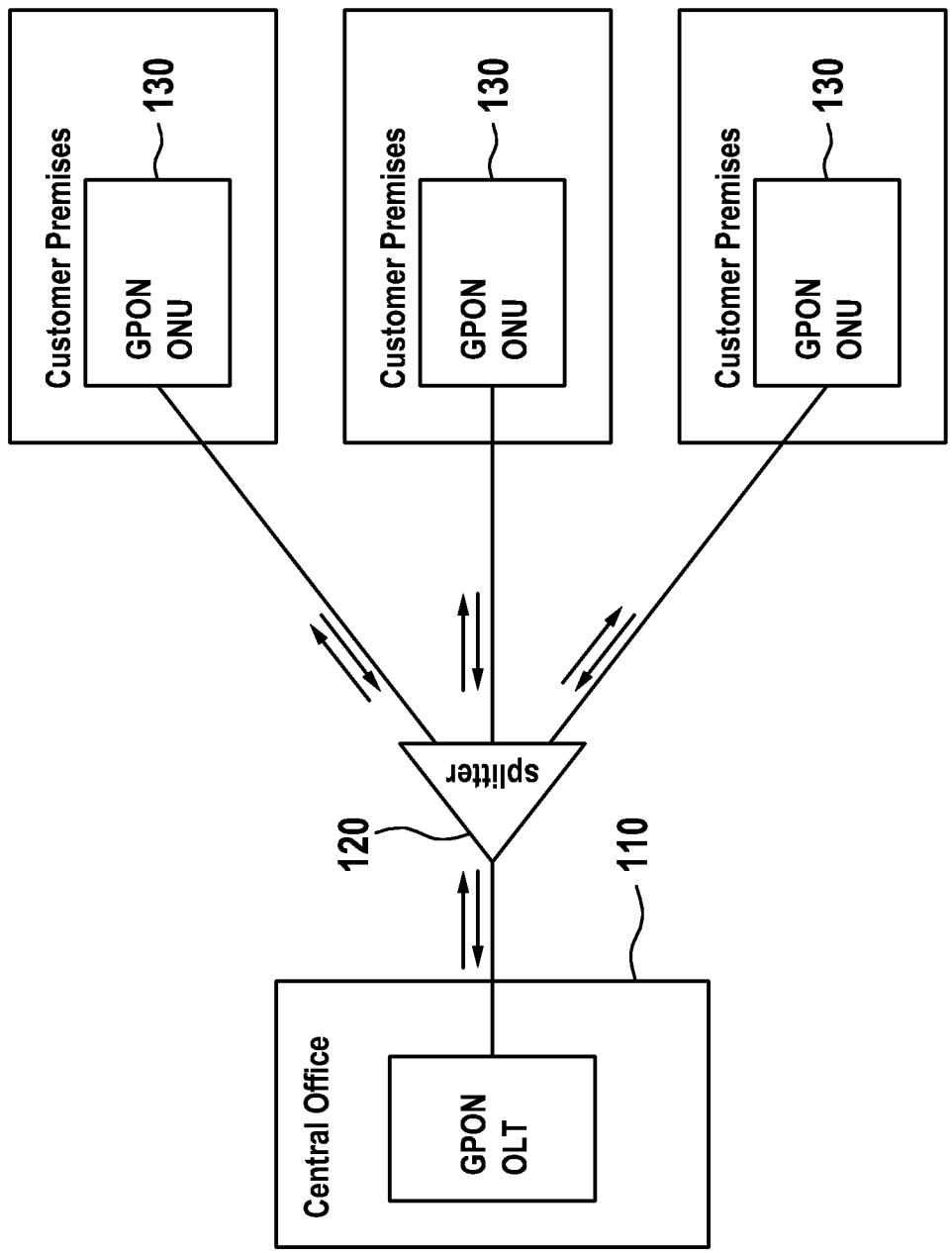
FIG. 1 shows a schematic diagram of a passive optical network comprising an optical line terminal and a plurality of optical network units.

PON, as shown in FIG. 1, are typically implemented as a Point-to-Multipoint network, comprising a single Optical line Terminal (OLT) 110 at the service provider's (or central office) side, connected to multiple Optical network Units 130 (ONUs) at the Customer Premises. An OLT is connected to its member ONUs through passive optical splitters 120, making the communication medium a "shared" medium. FIG. 1 shows a schematic diagram of a passive optical network comprising an optical line terminal and a plurality of optical network units. In FIG. 1, a GPON (Gigabit Passive Optical Network) OLT 110 is shown with a plurality of GPON ONUs 130.

Downstream data (from OLT to ONU) is broadcasted to all ONUs such that individual ONUs can decode and identify their own data based on a unique ID. In upstream direction, two or more ONUs may decide to send signals at the same time, which may eventually corrupt the data. To avoid such situations, each ONU is "allowed" to send upstream signals "only" at specific time slots, precisely computed and communicated by the OLT.

Figure 2:
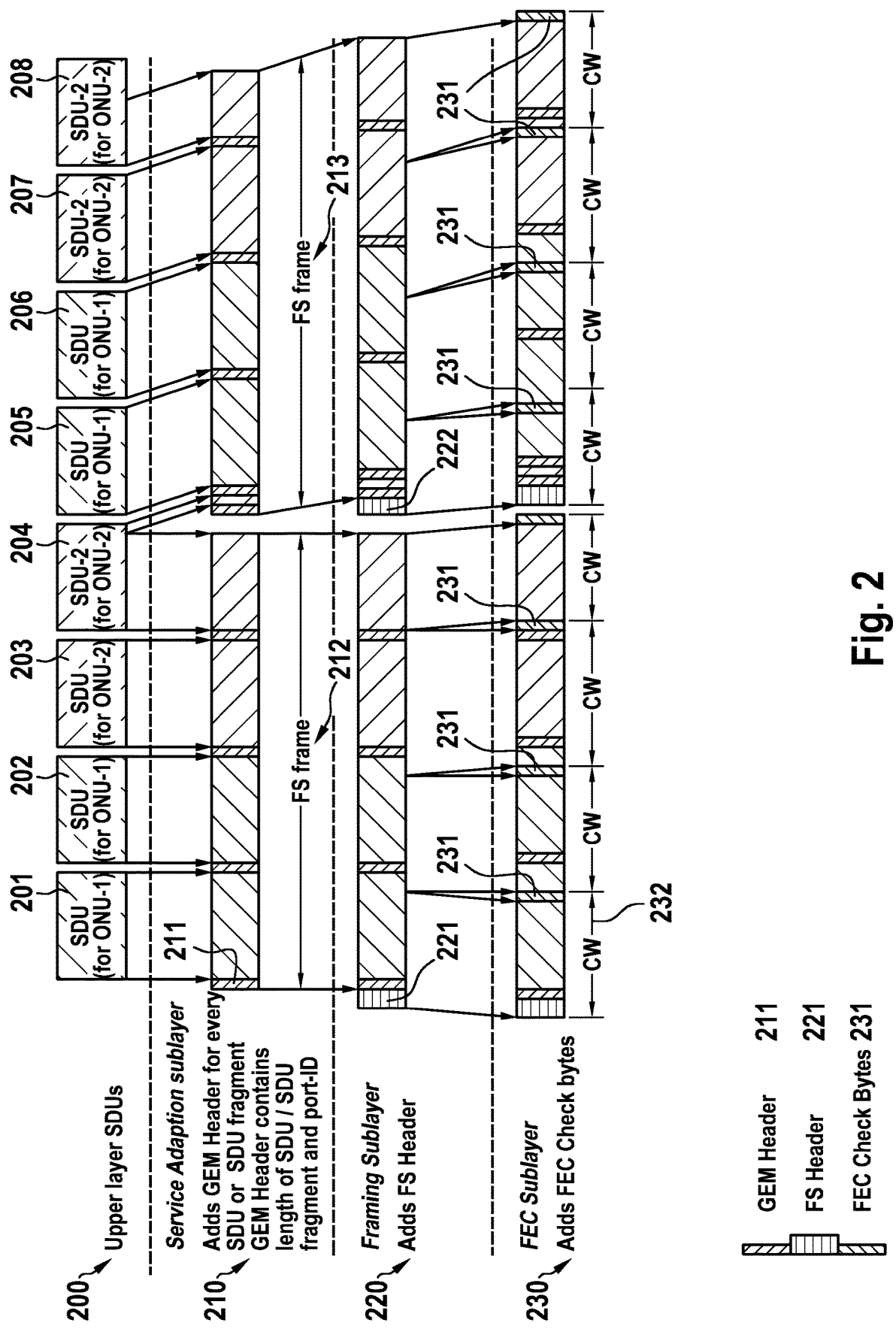
FIG. 2 shows a schematic illustration of a generation of a transmission frame.

The ITU-T (International Telecommunication Unit Telecommunication Standardization Sector) PON standards specify the procedure of mapping between the upper layer Service Data Units (SDUs) on one hand, and bitstreams suitable for modulating the optical carrier on the other hand as shown in FIG. 2. FIG. 2 shows a schematic illustration of a generation of a transmission frame, e.g. for downstream SDU mapping.

In FIG. 2 (and similarly FIGS. 3, 6, 7, 9 and 10), four rows are shown. The first row 200 (on top) shows the upper layer SDUs 201-208, which, in the examples shown in FIGS. 3, 6, 7, 9 and 10, are destined for either a first ONU (ONU-1) (SDUs 201, 202, 205, 206) or a second ONU (ONU-2) (SDUs 203, 204, 207, 208). The second row 210 shows the service adaptation sublayer, in which a GEM (GPON Encapsulation Mode) header 211 is added for every SDU or SDU fragment. The GEM header contains the length of the SDU/SDU fragment and a port-ID. The GEM header is added to each SDU at the head of each SDU. In the Example of FIG. 2, the fourth SDU 204 is split into two fragments, each fragment having a GME header. The SDUs are assigned to two Framing Sublayer (FS) frames 212; 213, with the first fragment of the fourth SDU being included in the first FS frame, and the second fragment of the fourth SDU being included in the second FS frame. The third row 220 shows the framing sublayer header, in which an FS header 221 is added to each FS frame. The fourth row 230 shows the Forward Error Correction (FEC) sublayer, in which FEC check bytes 231 are added at specific positions of the frame, with FEC check bytes being added at the end of a codeword (CW) 232 of the frame. In the example of FIG. 2 (and of 3, 6, 7, 9 and 10), each frame comprises a plurality of codeword (four in the examples).

The Service Adaptation Sublayer accepts the upper layer SDUs and assigns a GEM port-ID depending on the destination of the SDU, performs SDU fragmentation as necessary and adds the GEM Header to the SDU or SDU fragment. The SDU or SDU fragment with GEM header appended is called GEM Frame. The Framing Sublayer accepts series of GEM frames forming the FS payload from the Service Adaptation sublayer and constructs the downstream FS frame and appends the FS header. The FS header comprises or consists of the upstream bandwidth map and the Physical Layer OAM (PLOAM) messages. The FEC Sublayer accepts the FS frames, partitions them into FEC data blocks, computes and appends the FEC checkbytes, prepends the physical synchronization block and transmits the bitstream on the medium.

In the downstream direction, the traffic multiplexing functionality is centralized. The OLT multiplexes frames onto transmission medium using GEM Port-ID as key to identify frames belonging to different logical connections. Each ONU filters the downstream frames based on GEM Port-IDs and processes only the frames that belong to that ONU.

With the ever-increasing bandwidth demand, PON standards are evolving to provide higher data rates over PON. This means more bits are being transmitted on the physical medium, resulting in high Bit Error Rates (BER). To achieve effective error correction with high BER, complex and more compute intensive error correction schemes are used. With the evolution of 25G/50G standard (G.HSP, GPON Higher Speed PON), use of LDPC (Low-Density Parity Codes) coding is proposed. The increased computational complexity generally results in more power consumption.

Figure 3:
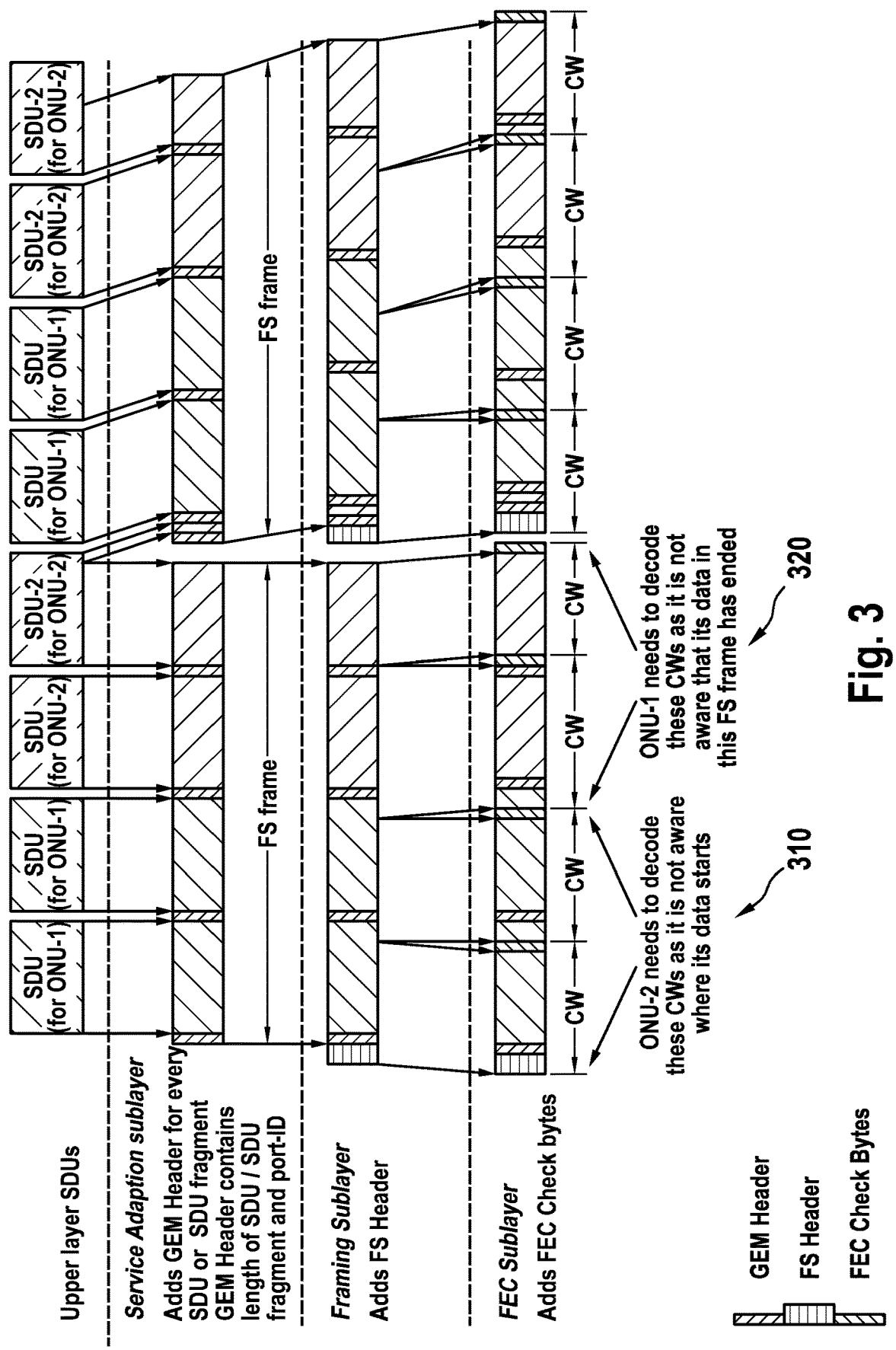
FIG. 3 shows a schematic illustration of a generation of a transmission frame, in which various portions of the transmission frame are highlighted in relation to a decoding process being performed by optical network units.

This poses some challenges to the specified framing procedure, as highlighted in FIG. 3, which may be addressed by examples of the present disclosure. FIG. 3 shows a schematic illustration of a generation of a transmission frame, in which various portions of the transmission frame are highlighted in relation to a decoding process being performed by optical network units. As is shown with respect to the frame generated in the framing sublayer, the first two SDUs (201, 202 in FIG. 2) for ONU-1 are split across the first three CWs of the frame, and the subsequent two SDUs (203, 204) for ONU-2 are split across CWs three and four of the first frame and the first CW of the second frame. However, as ONU-2 is not aware where the data designated for it starts, as shown in connection with FIG. 3 310, it may be required to decode the first two CWs of the first frame as well. Similarly, ONU-1 may be required to decode CWs three and four of the first frame as well, as shown in connection with FIG. 3 320, as it is not aware that its data in the FS frame has ended.

At the receiver's FEC Sublayer (or the LDPC decoding Sublayer), the ONU has no indication if all the CWs belong to itself or not. It is only at the Service Adaptation Sublayer, when the GEM Header is parsed, the ONU gets to know if the data belongs to itself or not. Thus, the compute intensive, power hungry LDPC decoder may be active for the entire PHY frame and decode all the received data.

In examples, methods are proposed to keep the ONU's LDPC decoder active only for the duration that is necessary (or keep it active when it is receiving its data and turn it off otherwise). This may result in a reduction of the power consumed by the ONU.

Some PON standards specify ONU power saving by protocol based ONU power management modes negotiated via OMCI (Optical network terminal Management Control Interface), where in ONU modes such as Doze, Cyclic sleep and Watchful sleep modes are defined. These mechanisms provide ONU power savings at coarse level where the ONU may shut down partially or completely during time intervals negotiated with the OLT. These standards might not specify receive data path power saving when the ONU is in active mode. Examples may provide a proposal for reducing receive data path power at a fine level, along with protocol based ONU power management increases ONU power saving significantly.

In various examples of the present disclosure, methods are proposed to indicate the presence of data belonging to an ONU upfront, at FS frame granularity. Using this information, the ONU may determine the position in the FS frame when it needs to turn on the LDPC decoder, and also determine the duration for which it needs to keep the LDPC decoder on. This way, an ONU may keep the LDPC decoder active only when it receives its own data. By adopting the proposed methods, the ONU may save significant power by keeping the compute intensive, power hungry LDPC decoder switched off when the OLT transmits data not intended for that ONU.

Figure 4A:
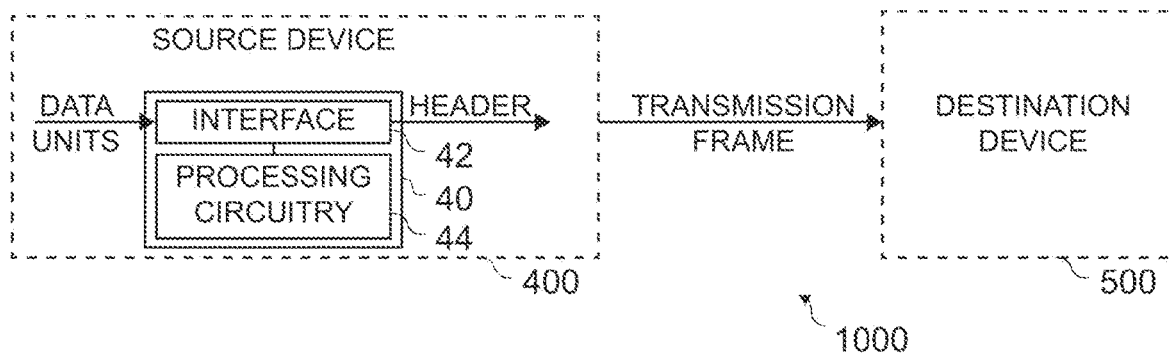
FIGS. 4a and 4b show schematic diagrams of a transmission apparatus or device for a source device, such as an optical line terminal.
Figure 4B:
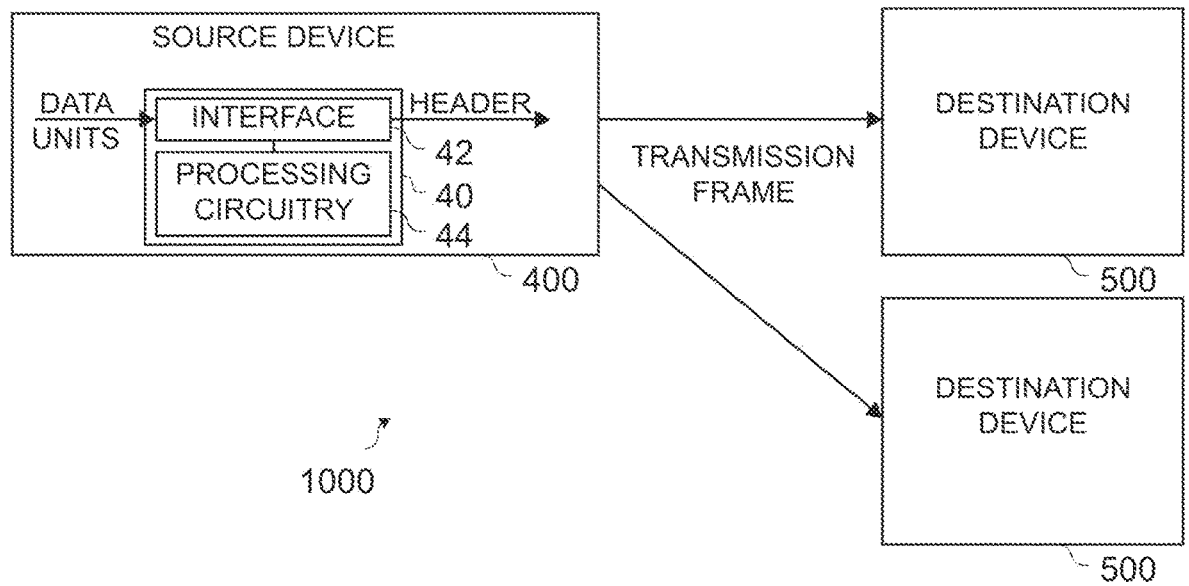

FIGS. 4a and 4b show schematic diagrams of a transmission apparatus 40 or device 40 for a source device 400, such as an optical line terminal. The components of the transmission device 40 are defined as component means, which correspond to the respective structural components of the transmission apparatus 40. The transmission apparatus 40 is suitable for, or configured to, generating/generate a header of a transmission frame to be transmitted downstream (i.e. a downstream transmission frame) from the source device 400 to a plurality of destination devices 500 via a point to multipoint communication network. The transmission apparatus comprises processing circuitry (or processing means) 44. Optionally, the transmission apparatus further comprises interface circuitry (or means for communication) 42 for communicating with other components of the source device, such as transceiver circuitry/transceiving means of the source device, which is coupled to the processing circuitry/means 44. In general, the functionality of the transmission apparatus is provided by the processing circuitry/processing means 44, e.g. in conjunction with the interface circuitry/means 42. For example, the processing circuitry is configured to generate the header based on a plurality data units to be transmitted to the destination devices. Each data unit is designated to be transmitted to one of the destination devices. The header is generated such, that the header comprises, for each destination device, information on a presence of data for the destination device in the transmission frame associated with the header. FIG. 4a further shows a source device 400, such as an optical line terminal 400, comprising the transmission apparatus 40. Accordingly, the point to multipoint communication network may be a passive optical network. However, the source device may be any other source device of any other point-to-multipoint network as well.

FIGS. 4a and 4b further show a passive optical network 1000 comprising the source device/optical line terminal 400 (with the transmission apparatus 40) and a plurality of destination devices/optical network units 500. Accordingly, the point to multipoint communication network may be a passive optical network (PON), e.g. Gigabit or Multigigabit PON. In more general terms, the point to multipoint communication network may be a wire-bound point to multipoint communication network, such as PON or such as a coaxial cable-based communication network. Alternatively, the point to multipoint communication may be a wireless point to multipoint communication network. In FIGS. 2 and 3, a frame being used in PONs is shown. This frame may be adapted using examples of the present disclosure. For example, the header of the transmission frame being referred to in FIGS. 4 and 5 may correspond to a framing sublayer header (of the PON) of the transmission frame, or may comprise the framing sublayer header and the GEM headers of the data units of the transmission frame. For example, the plurality of data units may correspond to the SDUs. The transmission apparatus is configured to at least generate the header of the transmission frame. Additionally, the transmission apparatus may further be configured to generate the transmission frame from the plurality of data units. For example, the generation of the transmission frame may comprise generating data unit headers (e.g. the GEM headers) for the plurality if data units, and generating and inserting forward error correction data (e.g. the FEC check bytes) for the transmission frame. Additionally, the generation of the transmission frame may comprise encapsulating the header of the transmission frame with the data units, the data unit headers and the forward error correction data in the transmission frame. For example, the transmission frame comprises a plurality of sub-frames (e.g. Code Words, CW), The processing circuitry may be configured to generate and insert the forward error correction data for each sub-frame based on the data included in the sub-frame.

Figure 4C:
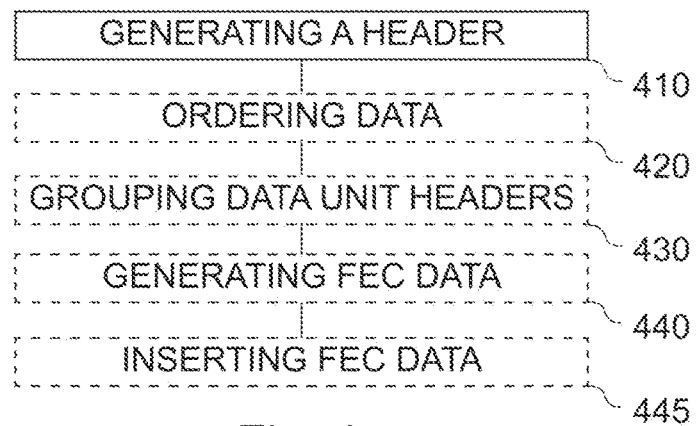
FIG. 4c shows a flow chart of an example of a method for a source device.

FIG. 4c shows a flow chart of an example of a corresponding transmission method for generating a header of a transmission frame to be transmitted downstream from a source device 400 to a plurality of destination devices 500 via a point to multipoint communication network. The transmission method comprises generating 410 the header based on a plurality data units to be transmitted to the destination devices. Each data unit is designated to be transmitted to one of the destination devices. The header is generated such, that the header comprises, for each destination device, information on a presence of data for the destination device in the transmission frame associated with the header.

The following description relates to the transmission apparatus and source device as well as to the corresponding method and computer program. Features introduced in connection with the transmission apparatus/device or source device may likewise be introduced into the corresponding transmission method. For example, the transmission method may be performed by the source device 400, e.g. by the transmission apparatus 40 of the source device 400.

Various aspects of the present disclosure relate to a transmission apparatus, transmission device, transmission method and computer program for generating a header of a transmission frame to be transmitted downstream from a source device 400 to a plurality of destination devices 500 via a point to multipoint communication network.

In general, as for example shown in connection with FIGS. 2 and 3, the generation of transmission frames is a process in which payload information, i.e. the plurality of data units, is combined with control information that are used to route and/or provide redundancy to the transmission of the payload information. Thus, the header is generated based on the plurality data units to be transmitted to the destination devices (i.e. e.g. the data units 201-208 shown in FIGS. 2, 3, 6, 7, 9 and 10). Each data unit is designated to be transmitted to (exactly) one of the destination devices. Therefore, each data unit is linked with information on the one of the destination devices that the respective data unit is to be transmitted to. This designation, and thus information on the one of the destination devices, is encoded into the header of the transmission frame, so the respective destination device 500 is made aware that the transmission frame is relevant for the destination device. In general, a transmission frame may comprise the header, payload information (which is based on the data units), and, optionally, redundancy information/error correction information. For example, the header of the transmission frame may be a framing sublayer header (of a passive optical network).

Thus, the header is generated such, that the header comprises, for each destination device, information on a presence of data for the destination device in the transmission frame associated with the header. The information on the presence of data for the destination device may subsequently be used by the respective destination device to decide on whether the remainder of the transmission frame is to be decoded, or whether decoding can be omitted, which can be beneficial with respect to processing power required, and thus also with respect to the power efficiency.

Figure 6:
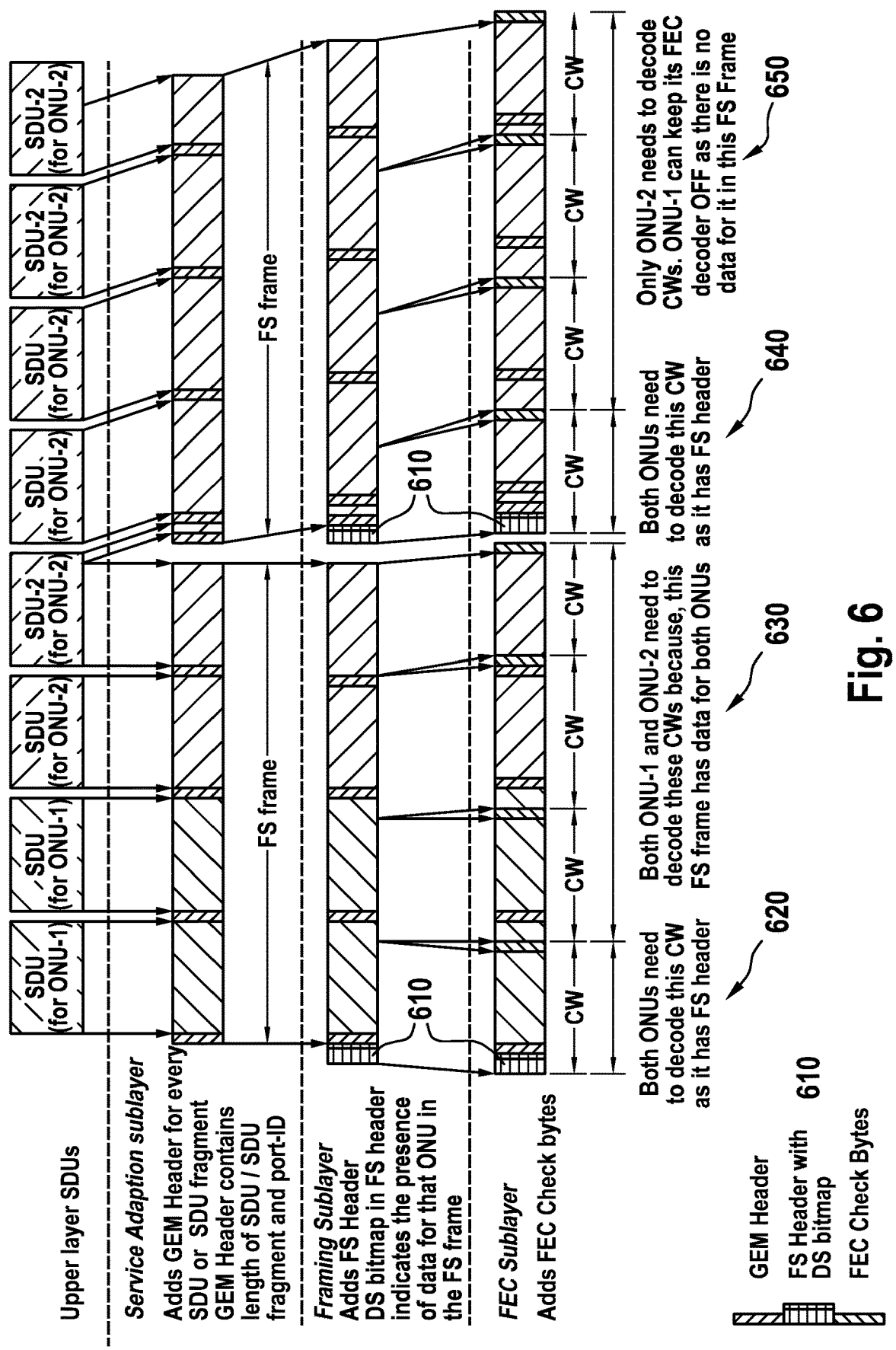
FIG. 6 shows a schematic illustration of a generation of a transmission frame according to an example, in which a bitmap indicating the presence of data is used.

In general, there are various options for including the information on the presence of the data within the header. For example, the header may merely indicate that the transmission frame comprises payload information for the respective destination device. This approach is illustrated in FIG. 6, for example. In FIG. 6, the header comprises at least a part of a bitmap, e.g. the entire bitmap, the bitmap indicating the presence of data for each of the plurality of destination devices. For example, the bitmap may comprise a plurality of bits, e.g. a bit vector. For example, each bit of the bitmap may indicate the presence of data for one of the destination devices. For example, if the transmission frame is transmitted to n destination devices, the bitmap may comprise n bits, one for each destination device. If the bit associated with a given destination device is set to a predefined value (e.g. "1"), the respective destination device may decode the remainder of the transmission frame, if not, the remainder may be skipped.

Figure 7:
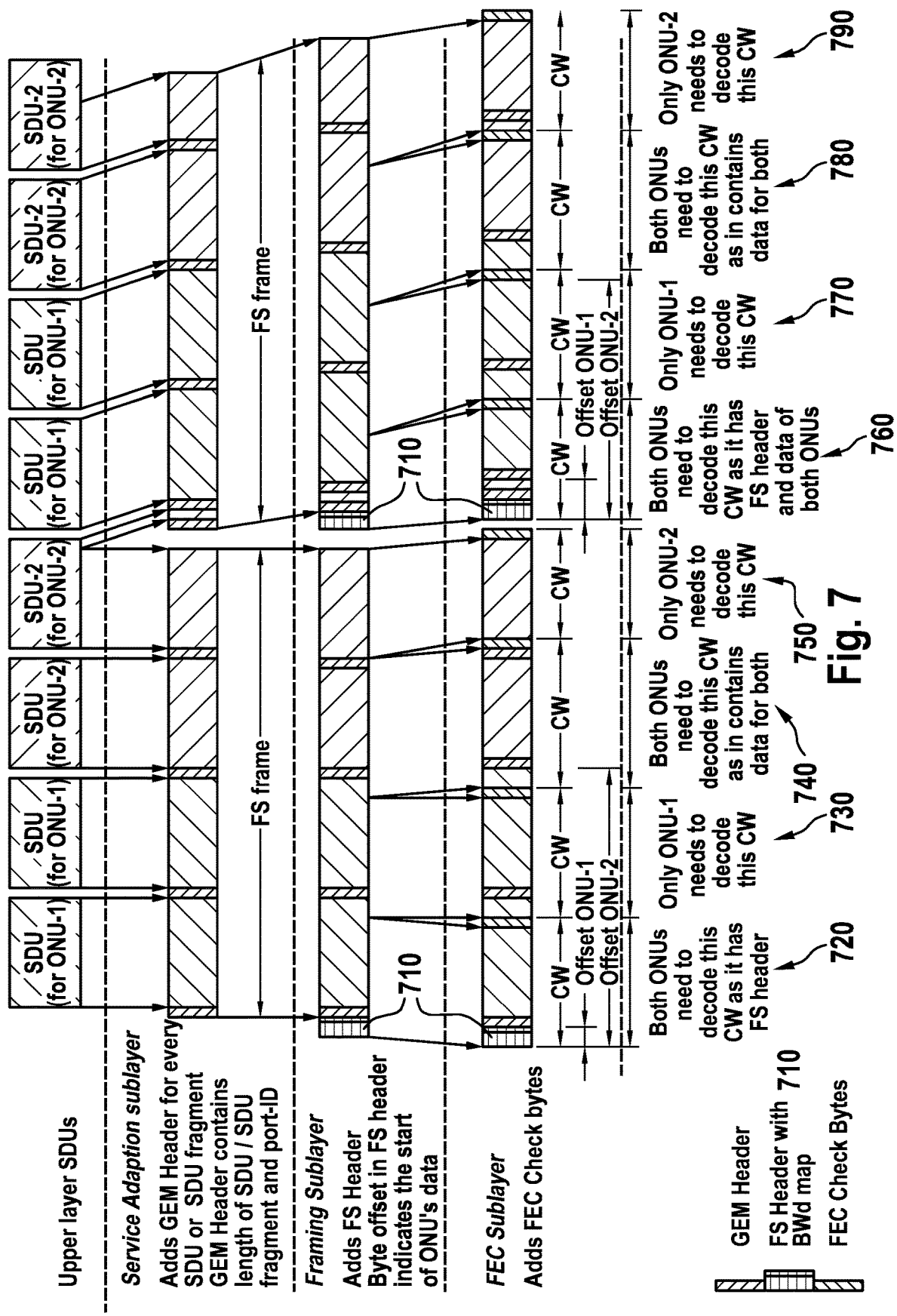
FIG. 7 shows a schematic illustration of a generation of a transmission frame according to an example, in which an offset between the header and data is included in the header.
Figure 9:
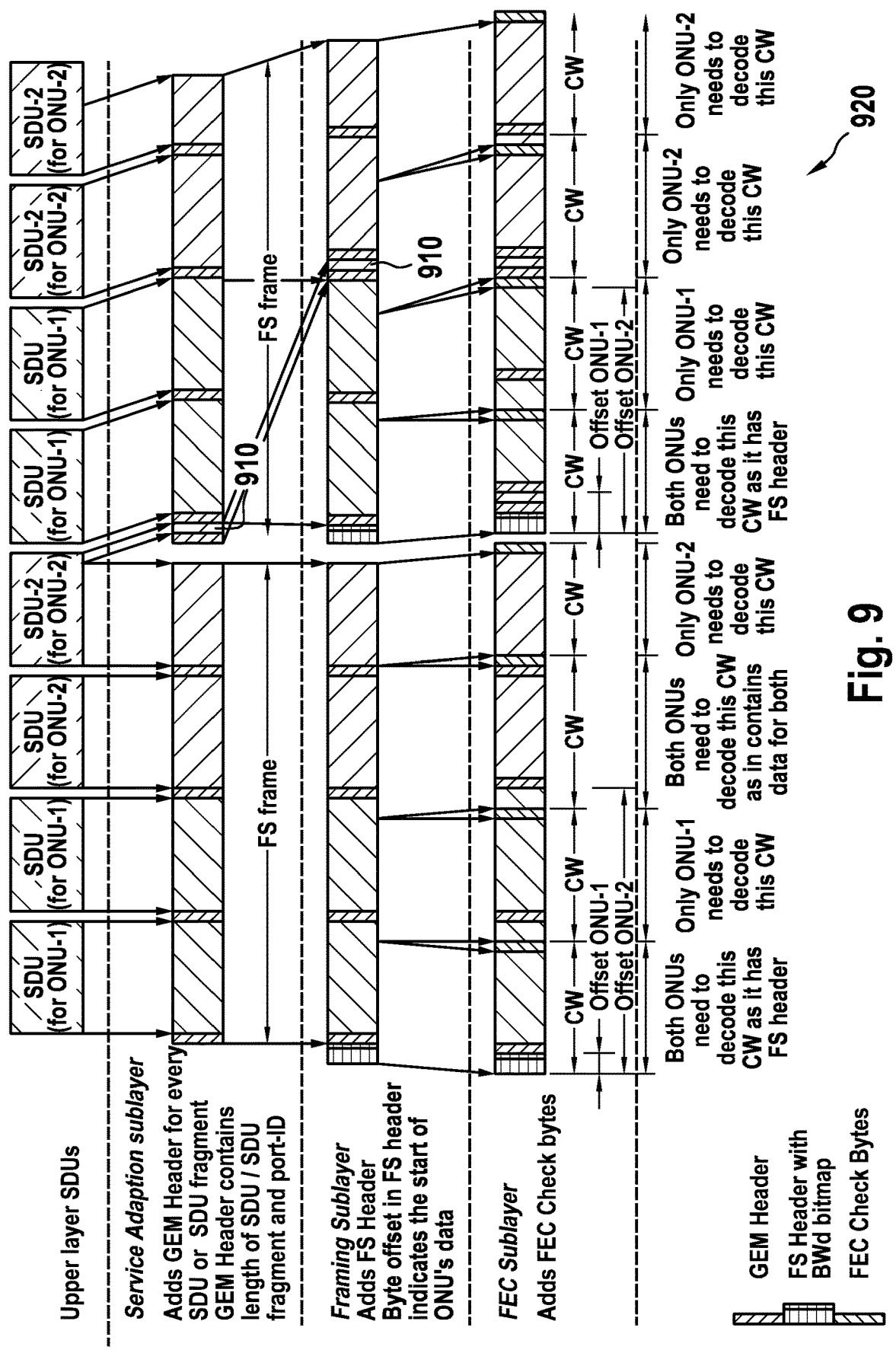
FIG. 9 shows a schematic illustration of a generation of a transmission frame according to an example, in which data destined for a destination device is grouped within the transmission frame.
Figure 10:
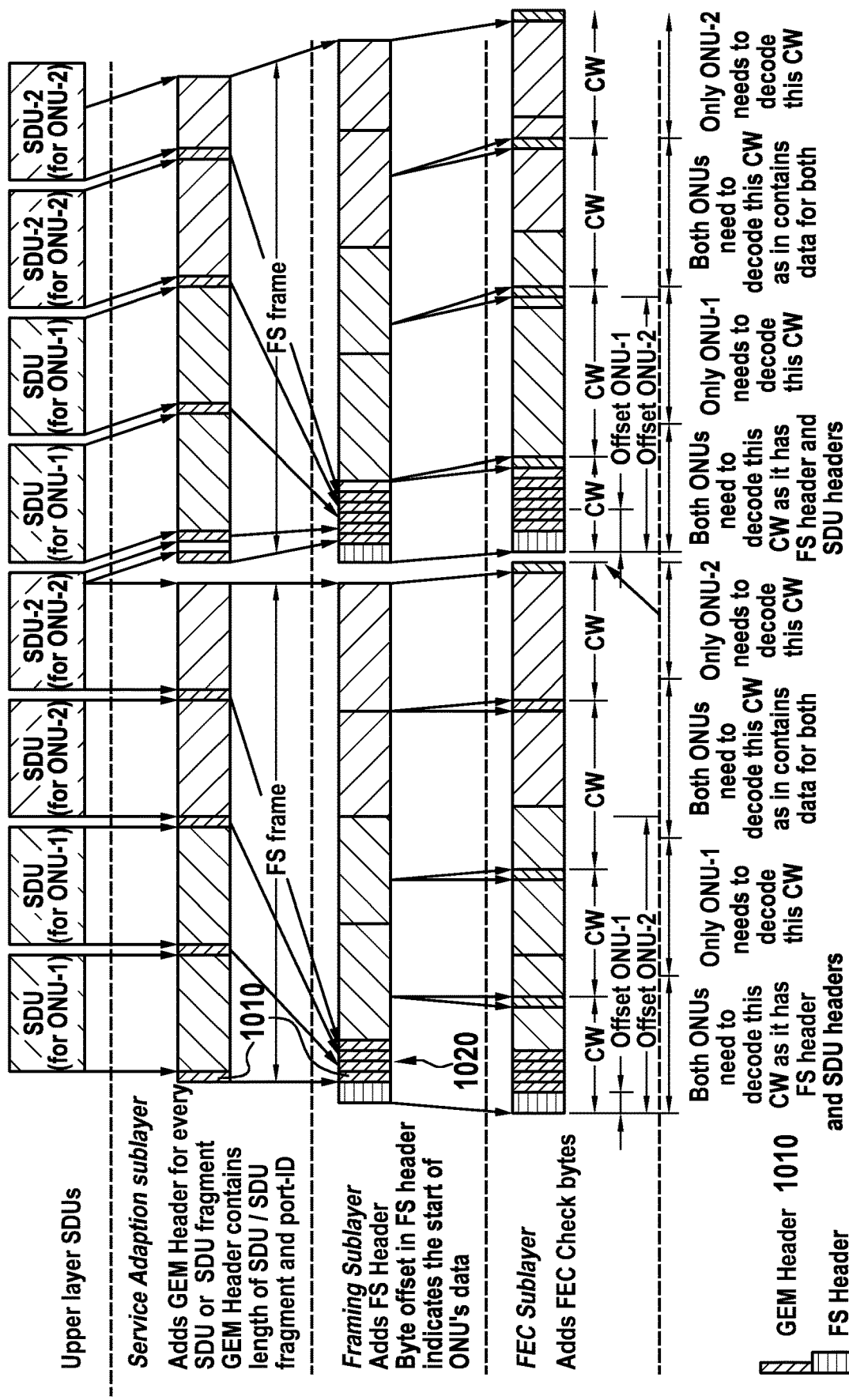
FIG. 10 shows a schematic illustration of a generation of a transmission frame according to an example, in which headers of the individual data headers are grouped together within the transmission frame.

In general, the transmission frame may comprise (e.g. be composed of) a plurality of sub-frames (denoted codewords in FIGS. 2, 3, 6, 7 9 and 10), which are portions of the transmission frame comprising the header or payload information and associated redundancy/error correction information. In other words, the transmission frame may comprise a plurality of sub-frames. For example, in FIGS. 2, 3, 6, 7, 9 and 10, each transmission frame comprises four sub-frames/codewords (CW). These codewords may be accessible, and decoded, separately by the respective destination device. For example, a given destination device might decode only the first and the fourth sub-frame of the transmission frame, as the first sub-frame comprises the header and the fourth sub-frame comprises payload information (based on one of the data units) that is designated for the transmission frame. To enable such a scenario, the header may include information on which of the sub-frames are relevant for which destination device. FIGS. 7, 9 and 10 show examples of such an approach. For example, the header may comprise, for each destination device with data present in the transmission frame, information on an offset between the header and the data designated for the destination device. The information on the offset may indicate a first sub-frame and/or a last sub-frame of the sub-frames of the transmission frame that is relevant for the respective destination device. For example, the information on the offset may indicate the offset with respect to a sub-frame of the plurality of sub-frames.

To enable a compact representation of the offset, and to avoid destination devices having to decode an unnecessarily large number of sub-frames, the payload information (i.e. the data units) included in the transmission frame may be sorted according to the destination device that the respective data units are designated for. For example, the processing circuitry may be configured to order the data of the plurality of data units such, that for each destination device with data present in the transmission frame, the respective data is grouped together within the transmission frame. Correspondingly, the method may comprise ordering 420 the data of the plurality of data units such, that for each destination device with data present in the transmission frame, the respective data is grouped together within the transmission frame. For example, the data may be ordered according to the destination device the data is designated for, e.g. in order to reduce the number of sub-frames to be decoded by the respective destination devices. For example, in FIG. 9, the portion 910 of the fourth data unit is grouped together with the other data units designated for ONU-2.

In the following, two approaches for representing the information on the offset are introduced. In a first approach, which is illustrated in FIGS. 7 and 9, the information on the offset may be compiled for the data units included in the transmission frame, and then provided in a compact representation for each of the destination devices affected. For example, the header may comprise, for each destination device with data present in the transmission frame, a field comprising an identifier of the destination device and the information on the offset for the destination device. For example, the information on the offset may be included in the header as a sequence of fields comprising the identifier of the destination device and the information on the offset. For example, for each destination device affected, and regardless of the number of sub-frames designated for the destination device, the header may comprise a single field comprising the identifier of the destination device and the information on the offset.

Alternatively, the respective data unit headers may be re-used. As can be seen in FIGS. 2, 3, 6, 7, 9 and 10, each data unit may be associated with a data unit header 211, which may also be included within the transmission frame. In FIGS. 2, 3, 6, 7 and 9, the data unit header may be grouped together with their associated data unit. Alternatively however, as shown in FIG. 10, the data unit headers may be brought forward (i.e. moved) into the header of the transmission frame, and be used to convey the information on the offset. In other words, the header of the transmission frame may comprise the headers of the data units, with the headers of the data units representing the information on the offset between the header of the transmission frame and the data designated for the destination device. For example, the processing circuitry may be configured to group the data unit headers within the header of the transmission frame. Accordingly, the method may comprise grouping 430 the data unit headers within the header of the transmission frame. For example, since the destination devices might have to decode the first sub-frame to decode the header of the transmission frame, they can now also decode the headers of the individual data units and deduce which sub-frames contain data designated for them. For example, each data unit header may comprise information on the destination device the data unit is designated for and information on a length of the data unit. The respective destination devices may use this information (i.e. the information on the destination device the data unit is designated for and the information on a length of the data unit to deduce which sub-frames contain data designated for them. For example, the offset between the header of the transmission frame and the data designated for the destination device is based on the lengths of the data units specified by the data unit headers. For example, the offset may be deduced by adding the respective lengths of the data units.

As indicated above, each transmission frame may further include some redundancy/error correction information, which may enable the destination devices to detect and/or correct errors introduced during transmission. For example, the processing circuitry may be configured to generate and insert forward error correction data for the transmission frame. Accordingly, the method may comprise generating 440 and inserting 445 forward error correction data for the transmission frame. For example, forward error correction data is redundant information that may enable the respective destination devices to correct errors introduced during transmission without having to rely on retransmission of the data. For example, with respect to the sub-frames introduced earlier, the forward error correct data may be generated and inserted for each sub-frame based on the data included in the sub-frame.

In various examples example, the data included in the transmission frame may be encoded using a low-density parity check, LDPC, code. Correspondingly, the processing circuitry may be configured to encode the transmission frame using an LDPC, e.g. on a sub-frame by sub-frame basis or the entire transmission frame at once. The method may comprise encoding the transmission frame using an LDPC.

Further optional features of the transmission apparatus/device or method will be shown in connection with FIGS. 6 to 10.

The interface circuitry/means for communicating 42 may correspond to one or more inputs and/or outputs for receiving and/or transmitting information, which may be in digital (bit) values according to a specified code, within a module, between modules or between modules of different entities.

For example, the means for communicating 42 may comprise interface circuitry configured to receive and/or transmit information.

In examples, the processing circuitry 44/processing means 44 may be implemented using one or more processing units, one or more processing devices, any means for processing, such as a processor, a computer or a programmable hardware component being operable with accordingly adapted software. In other words, the described function of the processing circuitry/means 44 may as well be implemented in software, which is then executed on one or more programmable hardware components. Such hardware components may comprise a general-purpose processor, a Digital Signal Processor (DSP), a micro-controller, etc.

More details and aspects of the transmission apparatus, device or method are mentioned in connection with the proposed concept or one or more examples described above or below (e.g. FIGS. 1 to 3, 5 to 10). The transmission apparatus, device or method may comprise one or more additional optional features corresponding to one or more aspects of the proposed concept or one or more examples described above or below.

Figure 5A:
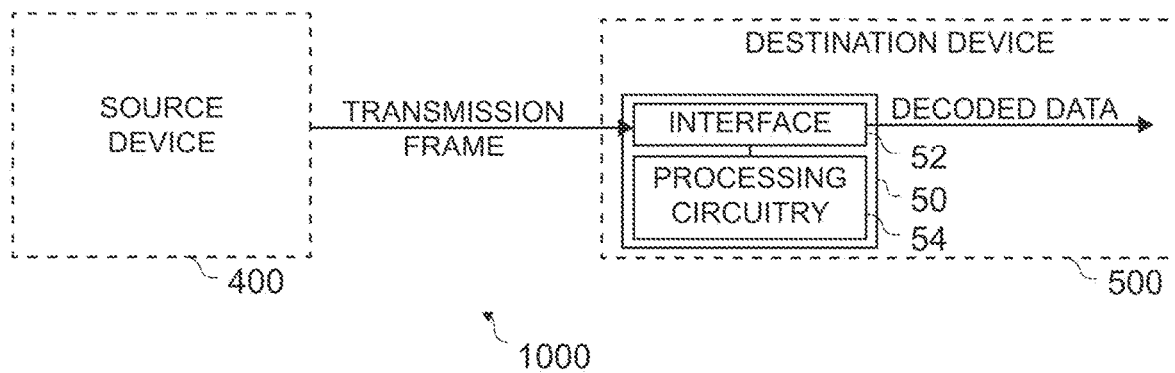
FIGS. 5a and 5b show schematic diagrams of a reception apparatus or device for a destination device, such as an optical network unit.
Figure 5B:
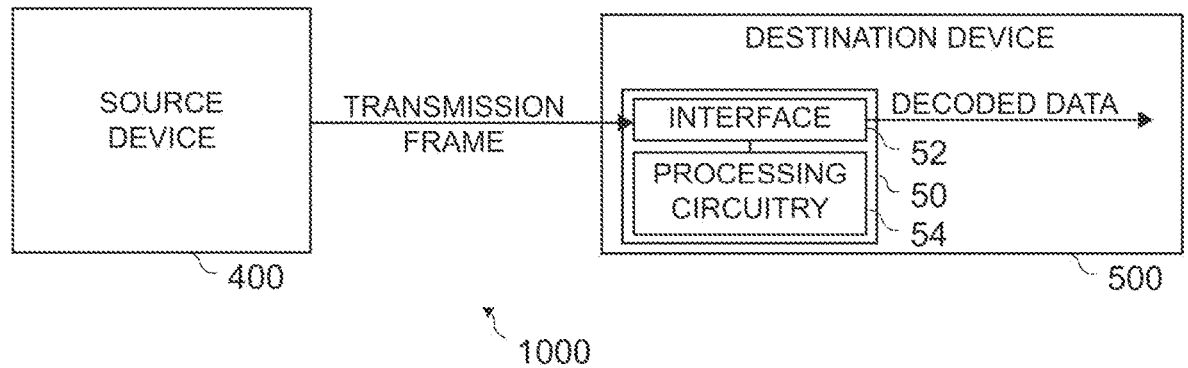

FIGS. 5*a* and 5*b* show a schematic diagram of a reception apparatus 50 or device 50 for a destination device 500, such as an optical network unit. The components of the reception device 50 are defined as component means, which correspond to the respective structural components of the reception apparatus 50. The reception apparatus/device 50 is suitable for decoding a transmission frame transmitted downstream (i.e. downstream transmission frame) from a source device 400 to a plurality of destination devices 500 via a point to multipoint communication network. The reception apparatus/device is associated with a destination device of the plurality of destination devices (i.e. comprised by). The reception apparatus comprising processing circuitry (or processing means) 54. Optionally, the reception apparatus further comprises interface circuitry (or means for communication) 52 for communicating with other components of the destination device, such as transceiver circuitry/transceiving means of the destination device, which is coupled to the processing circuitry/means 54. In general, the functionality of the reception apparatus is provided by the processing circuitry/processing means 54, e.g. in conjunction with the interface circuitry/means 52. For example, the processing circuitry is configured obtain a header of the transmission frame. The header comprises, for each destination device, information on a presence of data for the destination device in the transmission frame. The processing circuitry is configured to decode (only) a portion of the transmission frame designated for the destination device based on the header of the transmission frame.

Figure 5C:
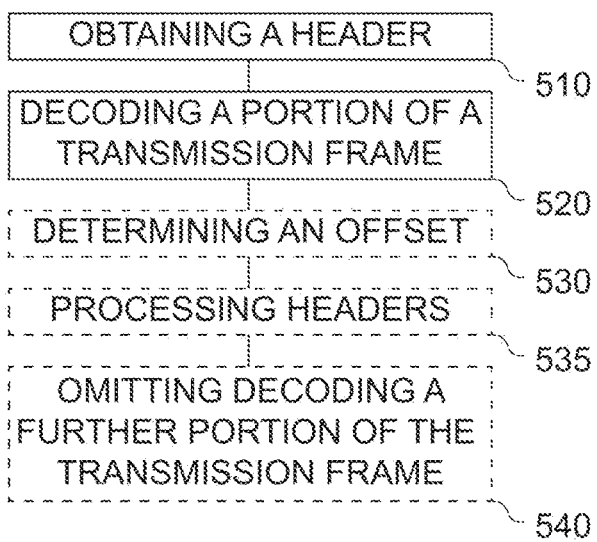
FIG. 5c shows a flow chart of an example of a method for a destination device.

As shown in FIG. 5*c*, examples of the present disclosure further provide a corresponding reception method, the method comprising obtaining 510 the header of the transmission frame, the header comprising, for each destination device, information on a presence of data for the destination device in the transmission frame. The method comprises decoding 520 (only) the portion of the transmission frame designated for the destination device based on the header of the transmission frame. The following description relates both to the apparatus/device and to the method. Features described in connection with the apparatus/device may likewise be applied to the corresponding method.

Examples of the present disclosure further provide the destination device 500 comprising the reception apparatus/device 50 or being configured to perform the reception method. For example, the destination device may be an optical network unit. FIGS. 5*a* and 5*b* further shows a passive optical network 1000 comprising the source device/optical line terminal 400 and a plurality of destination devices/optical network units 500.

As will be shown in the following, examples of the present disclosure may be used to indicate, to a decoder of the destination device, portions of the transmission frame to be decoded, and other portions that are to be omitted from decoding, e.g. portions that are designated for other destination devices. Accordingly, the header of the transmission frame may be designated for each of the plurality of destination devices. In other words, the header of the transmission frame may be designated for each of the destination devices.

In general, the transmission frame comprises the header and data designated for the plurality of designation devices. The transmission frame may further comprise one or more optional components, such as data unit headers of the data for the destination devices, and/or forward error correction data. For example, each transmission frame may comprise or be composed of a plurality of sub-frames (i.e. codewords), with each sub-frame comprising corresponding forward error correction data. For example, the header of the downstream transmission frame may comprise data that indicates a subset out of a larger group of sub-frames/codewords that is subject to be decoded for one particular destination device/ONU. The reception apparatus may be configured to determine, based on the header of the transmission frame, which of the plurality of sub-frames of the transmission frame are to be decoded, and to decode the respective portions accordingly. For example, the respective portion or portions may be decoded using an LDPC decoder. In other words, the data included in the transmission frame may be encoded using a low-density parity check, LDPC, code. The processing circuitry may be configured to decode the low-density parity check coded data. For example, the decoder may be disabled for portions of the transmission frame only designated for other destination devices.

In general, the transmission frame may start with the header. The header of the transmission frame may be designated for each of the plurality of destination devices. In other words, each of the plurality of destination devices may decode the header. The header comprises, for each destination device, information on the presence of data for the destination device in the transmission frame. Accordingly, after decoding the header, the reception device may be configured to determine whether to decode the remainder of the transmission frame. For example, the remainder of the transmission frame may be decoded, if the information on the presence of data for the destination device in the transmission frame indicates, that the transmission frame comprises data for the destination device (apart from the header). In other words, the processing circuitry is configured to decode at least a portion of the remainder of the transmission frame if the header indicates the presence of data for the destination device. For example, the processing circuitry may be configured to omit decoding a further portion of the destination device not designated for the destination device. Correspondingly, the method may comprise omitting 540 decoding a further portion of the destination device not designated for the destination device. For example, the further portion may be designated to one of the other destination devices. For example, the further portion may be discarded. The processing circuitry may be configured to decode at least a portion of the remainder of the transmission frame if the header indicates the presence of data for the destination device.

As pointed out in connection with FIGS. 4a to 4c, there are various options for including the information on the presence of the data within the header. For example, the header may comprise (at least a part of) a bitmap indicating the presence of data for each of the plurality of destination devices. For example, the processing circuitry may be configured to decode at least a portion of the remainder of the transmission frame if the (at least part of the) bitmap indicates the presence of data for the destination device.

Alternatively or additionally, as introduced in connection with FIGS. 4, 7, 9, and 10, the header may comprise, for each destination device with data present in the transmission frame, information on an offset between the header and the data designated for the destination device. Accordingly, the processing circuitry may be configured to decode the portion of the transmission frame according to the information on the offset if the transmission frame comprises data for the destination device. For example, the processing circuitry may be configured to determine, based on the information on the offset, which of the plurality of sub-frames contain data designated for the destination device, and decode the respective sub-frames.

Again, two approaches for representing the information on the offset are introduced. In the first approach, which is illustrated in FIGS. 7 and 9, the information on the offset may be compiled for the data units included in the transmission frame, and then included in a compact representation for each of the destination devices affected. Alternatively, the respective data unit headers may be re-used, as shown in FIG. 10, where the header of the transmission frame comprises headers of data units being included in the transmission frame, the headers of the data units representing the information on the offset between the header of the transmission frame and the data designated for the destination device. In the first approach, the information on the offset can be read out from the header. In the second approach, however, the individual data unit headers may be decoded, evaluated, and the offset may be calculated based on the data unit headers. For example, the processing circuitry may be configured to determine the offset between the header of the transmission frame and the data designated for the destination device based by processing the headers of the data units. Accordingly, the method may comprise determining 530 the offset between the header of the transmission frame and the data designated for the destination device based by processing 535 the headers of the data units.

Further optional features of the reception apparatus/device or method will be shown in connection with FIGS. 6 to 10.

The interface circuitry/means for communicating 52 may correspond to one or more inputs and/or outputs for receiving and/or transmitting information, which may be in digital (bit) values according to a specified code, within a module, between modules or between modules of different entities. For example, the means for communicating 52 may comprise interface circuitry configured to receive and/or transmit information.

In examples, the processing circuitry 54/processing means 54 may be implemented using one or more processing units, one or more processing devices, any means for processing, such as a processor, a computer or a programmable hardware component being operable with accordingly adapted software. In other words, the described function of the processing circuitry/means 54 may as well be implemented in software, which is then executed on one or more programmable hardware components. Such hardware components may comprise a general-purpose processor, a Digital Signal Processor (DSP), a micro-controller, etc.

More details and aspects of the reception apparatus, device or method are mentioned in connection with the proposed concept or one or more examples described above or below (e.g. FIG. 1 to 4c, 6 to 10). The reception apparatus, device or method may comprise one or more additional optional features corresponding to one or more aspects of the proposed concept or one or more examples described above or below.

Various examples of the present disclosure propose methods to indicate the presence of data belonging to an ONU upfront at FS frame granularity, by either augmenting the FS frame header to include fields which indicate presence of ONU specific downstream data or by rearranging some of the headers in the FS frame. The change of the headers may be implicitly visible and may be implemented by different vendors for interoperability. For example, various examples of the present disclosed may be implemented in the G.HSP (Higher Speed PON) standard.

A major aspect in examples is to provide an indication of the presence of data belonging to an ONU upfront, at FS frame granularity. The following methods of either augmenting the Framing Sublayer Header to include additional fields or rearranging some data are proposed to enable turning off the ONU's FEC decoder when not needed. In the following, some exemplary approaches are shown. Examples may encompass all schemes that indicate to the ONU the presence of its downstream traffic in the downstream FS frame.

In a first example, a downstream bitmap-based approach is shown. In this approach, it is proposed to add (at least a part of) a bitmap in the downstream FS header. In other words, the header of the transmission frame may comprise (at least a part of) a bitmap indicating the presence of data for each of the plurality of destination devices. Each bit in the bitmap may be correspond to an ONU_ID (i.e. identifier of a destination device of the plurality of destination devices) assigned by the OLT (i.e. the source device) during initialization. The bit corresponding to an ONU may indicate the presence of data for it in the current FS frame. If the bit corresponding to an ONU is 0, it may turn OFF the FEC decoder after decoding the FS Header. If the bit is 1, it may continue decoding the FS frame and pass its data to the upper layer. The processing circuitry of the reception apparatus may be configured to control the decoder accordingly.

FIG. 6 shows a schematic illustration of a generation of a transmission frame according to an example, in which a bitmap indicating the presence of data is used for the downstream transmission frame. As can be seen in rows three and four, the bitmap may be included in the header of the transmission frame 610. Both ONUs (destination devices) may decode the first CW of each frame (see FIGS. 6 620 and 640), as it comprises the header. For the subsequent frames, the bitmap is considered. CWs two to four of the first frame of FIG. 6 are decoded by both ONUs ONU-1 and ONU-2 (see FIG. 6 630), as the downstream transmission comprises data for both ONUs. For the second frame, only ONU-2 might decode CWs two to four (see FIG. 6 650). ONU-1 may keep its FEC decoder off, as the frame contains no further data for it (as evidenced by the bitmap).

In a second example, a first downstream bandwidth allocation-based approach is shown. In this approach, it is proposed to add an ONU specific "Offset" 710 in the downstream FS header. This Offset may specify to the ONU (destination device), where its data starts in the current FS frame. In other words, the header of the transmission frame may comprise, for each destination device with data present in the transmission frame, information on an offset between the header and the data designated for the destination device. The processing circuitry of the reception apparatus may be configured to decode the portion of the transmission frame according to the information on the offset if the transmission frame comprises data for the destination device. The ONU may keep track of the alignment of the FEC codewords by counting the number of bits received at the FEC sublayer, but might not decode all the codewords. Using the offset, it may calculate the codeword that contains the start of its data and starts decoding from that codeword onwards. For example, the information on the offset may indicate the offset with respect to a sub-frame of the plurality of sub-frames (codewords of the plurality of codewords). It may continue to decode until it encounters a GEM header corresponding to some other ONU. In other words, the processing circuitry of the reception apparatus may be configured to stop decoding the transmission frame once data designated for another destination device is encountered within the transmission frame. The OLT may transmit all the data corresponding to a particular ONU continuously. It might not interleave data of different ONUs. In other words, data for different destination devices might not be interleaved in the transmission frame.

FIG. 7 shows a schematic illustration of a generation of a transmission frame according to an example, in which an offset 710 between the header and data is included in the header. Again, the offset is included in the FS header, as shown in rows three and four of FIG. 3. The offset for ONU-1 may specify the offset between the start of the frame and the start of the first GEM header for ONU-1. The offset for ONU-2 may specify the offset between the start of the frame and the start of the first FEM header for ONU-2. For example, the offset may be specified in terms of CWs. As can be seen in FIG. 7, both ONU-1 and ONU-2 may decode the first CW of the first frame (720). Only ONU-2 might decode the second CW of the first frame (730), as the offset for ONU-2 points beyond the second CW of the first frame. Both ONUs may decode the third CW of the first frame (740), as it contains data for both. Only ONU-2 might decode the fourth CW (750), as ONU-1 has encountered data for ONU-2 in the third CW. In the second frame, the same procedure is applied, with ONU-1 decoding CWs one to three (760, 770, 780), and ONU-2 decoding CWs one, three and four (760, 780, 790).

Figure 8:
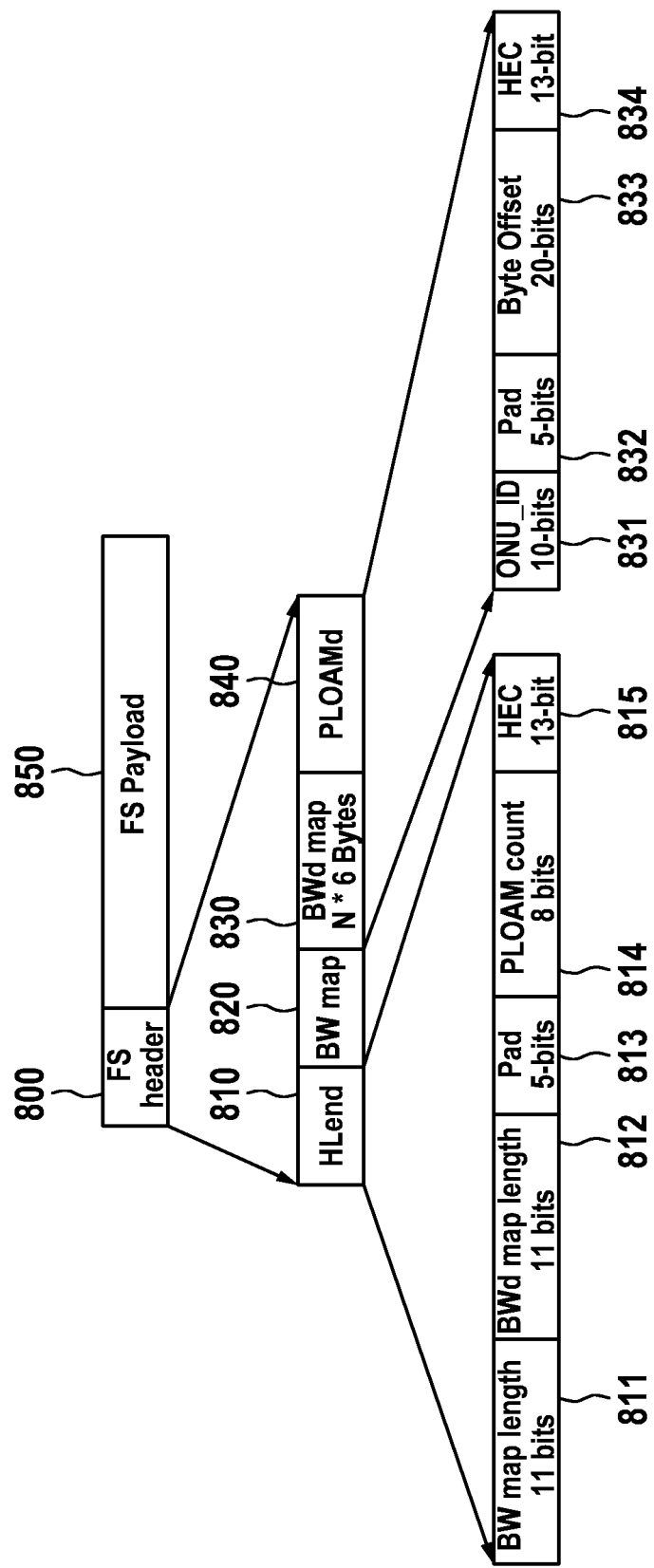
FIG. 8 shows a schematic illustration of an exemplary header with a bitmap indicating the presence of data and an offset between the header and data.

The "Offset" may be contained in a new field, downstream Bandwidth map (BWd) that may be added to the FS header. The BWd may contain the Offset for each of the active ONUs. For example, the header may comprise, for each destination device with data present in the transmission frame, a field comprising an identifier of the destination device and the information on the offset for the destination device. FIG. 8 shows an example of the augmented FS header comprising the BWd. FIG. 8 shows a schematic illustration of an exemplary header 800 with a bitmap indicating the presence of data and an offset between the header and data. In the first row, the transmission frame is shown, with the FS header 800 (i.e. the header of the transmission frame) and the FS payload 850 (i.e. the data for the destination devices). The FS header may comprise an HLend 810 (Header Length downstream) field, the BW map field 820, the BWd map field 830 (comprising N (the number of different destination devices) times 6 bytes) and the PLOAMd 840 (Physical Layer Operations, Administration and Maintenance downstream). The HLend field may comprise the BW map length 811 (11 bits), the BWd map length 812 (11 bits), a padding field 813 (5 bits), a PLOAM count field 814 (8 bits) and an HEC field 815 (Hybrid Error Correction, 13 bits). The BWd map may comprise the ONU_ID 831 (identifier of the ONU, 10-bits), a padding field 832 (5 bits), a byte offset 833 (20 bits) and a HEC field 834 (13 bits).

In some examples, the SDU fragmentation procedure is implemented similar to the recommendation in G.987.3 and G.989.3 standards. If the last SDU in a FS frame is fragmented, the second fragment of the SDU may be transmitted prior to any other SDU. In the example shown in FIG. 7, the last SDU of ONU-2 in the first FS frame is fragmented. The second fragment of this SDU may be transmitted in the second FS frame prior to any other SDU. While decoding in the first FS frame, ONU-2 would be aware of the fragmentation of the SDU and may continue to decode the SDU in the 2nd FS frame. The offset corresponding to ONU-2 would be the start of a new SDU. In other words, if the processing circuitry of the reception apparatus is aware that the frame contains further data for the destination device, e.g. as a data unit is transmitted over two frames, it may decode the data at the beginning of the subsequent frame accordingly, and subsequently take the offset into consideration.

In a third example, a second downstream bandwidth allocation-based approach is shown. In this method, the grouping of ONU's data in FS frame is slightly different from the second example. The fragment of an ONU's SDU is grouped along with other complete or fragments of SDUs destined to the same ONU. In other words, the processing circuitry may be configured to order (i.e. reorder) the data of the plurality of data units such (e.g. by bringing forward or delaying fragments of data units), that for each destination device with data present in the transmission frame, the respective data is grouped together within the transmission frame. FIG. 9 shows a schematic illustration of a generation of a transmission frame according to an example, in which data destined for a destination device is grouped within the transmission frame. As can be seen between the second and third row, the fragment 910 of the fourth SDU (for ONU-2) that is moved to the second frame is grouped together with the other SDUs for the ONU-2. In this approach, the respective ONU/destination device might not have to remember that an SDU is continued across two frames. Instead, the ONU/destination device might only consider the offset. Accordingly, in the first frame, ONU-1 might decode CWs one to three, and ONU-2 might decode CWs one, three and four. In the second frame, ONU-1 might decode CWs one and two, and ONU-2 might decode CWs one, three and four. Consequently, compared to the example of FIG. 7, only ONU-2 might decode CW three (920), instead of both ONUs.

In a fourth example, an SDU header grouping based approach is shown. In this approach, the SDU headers of all SDUs or SDU fragments in an FS frame may be grouped in the same order as SDU or SDU fragments and may be transmitted ahead of FS payload. In other words, each data unit (SDU) is associated with a data unit header (GEM header). The header of the transmission frame may comprise the headers of the data units. For example, the FS sublayer header of the frame might comprise the GEM headers, or may be grouped with the headers of the SDU, to form a contiguous/concatenated header of the frame. The headers of the data units may represent the information on the offset between the header of the transmission frame and the data designated for the destination device. For example, the processing circuitry of the transmission apparatus may be configured to group the data unit headers within the header of the transmission frame. Each data unit header may comprise information on the destination device the data unit is designated for and information on a length of the data unit. The offset between the header of the transmission frame and the data designated for the destination device may be based on the lengths of the data units specified by the data unit headers. The processing circuitry of the reception apparatus may be configured to determine the offset between the header of the transmission frame and the data designated for the destination device based by processing the headers of the data units. In other words, based on the payload length indication field and the corresponding GEM port-ID field in the SDU header, the ONU may accurately calculate what codewords shall be decoded and shall keep the LDPC decoder on accordingly.

FIG. 10 shows a schematic illustration of a generation of a transmission frame according to an example, in which headers of the individual data headers are grouped together within the transmission frame. As can be seen in rows three and four, the headers 1010 of the individual data units/SDUs are grouped together 1020 with the FS header to form the header of the transmission frame. The offset for ONUs 1 and 2 is derivable from the headers. In the first frame, ONU-1 might decode CWs one to three, and ONU-2 might decode CWs one, three and four. In the second frame, ONU-1 might decode CWs one to three, and ONU-2 might decode CWs one, three and four.

The aspects and features mentioned and described together with one or more of the previously detailed examples and figures, may as well be combined with one or more of the other examples in order to replace a like feature of the other example or in order to additionally introduce the feature to the other example.

Example 1 relates to a transmission apparatus (40) for generating a header of a transmission frame to be transmitted downstream from a source device (400) to a plurality of destination devices (500) via a point to multipoint communication network, the transmission apparatus comprising processing circuitry (44) configured to generate the header based on a plurality data units to be transmitted to the destination devices, wherein each data unit is designated to be transmitted to one of the destination devices, wherein the header is generated such, that the header comprises, for each destination device, information on a presence of data for the destination device in the transmission frame associated with the header.

In Example 2, the subject matter of example 1 or any of the Examples described herein may further include, that the header comprises at least a part of a bitmap indicating the presence of data for each of the plurality of destination devices.

In Example 3, the subject matter of one of the examples 1 to 2 or any of the Examples described herein may further include, that the header comprises, for each destination device with data present in the transmission frame, information on an offset between the header and the data designated for the destination device.

In Example 4, the subject matter of example 3 or any of the Examples described herein may further include, that the processing circuitry is configured to order the data of the plurality of data units such, that for each destination device with data present in the transmission frame, the respective data is grouped together within the transmission frame.

In Example 5, the subject matter of one of the examples 3 to 4 or any of the Examples described herein may further include, that the header comprises, for each destination device with data present in the transmission frame, a field comprising an identifier of the destination device and the information on the offset for the destination device.

In Example 6, the subject matter of one of the examples 3 to 4 or any of the Examples described herein may further include, that each data unit is associated with a data unit header, wherein the header of the transmission frame comprises the headers of the data units, the headers of the data units representing the information on the offset between the header of the transmission frame and the data designated for the destination device.

In Example 7, the subject matter of example 6 or any of the Examples described herein may further include, that the processing circuitry is configured to group the data unit headers within the header of the transmission frame.

In Example 8, the subject matter of one of the examples 6 to 7 or any of the Examples described herein may further include, that each data unit header comprises information on the destination device the data unit is designated for and information on a length of the data unit, wherein the offset between the header of the transmission frame and the data designated for the destination device is based on the lengths of the data units specified by the data unit headers.

In Example 9, the subject matter of one of the examples 3 to 8 or any of the Examples described herein may further include, that the transmission frame comprises a plurality of sub-frames, wherein the information on the offset indicates the offset with respect to a sub-frame of the plurality of sub-frames.

In Example 10, the subject matter of one of the examples 1 to 9 or any of the Examples described herein may further include, that the point to multipoint communication network is a passive optical network.

In Example 11, the subject matter of one of the examples 1 to 10 or any of the Examples described herein may further include, that the header of the transmission frame is a framing sublayer header.

In Example 12, the subject matter of one of the examples 1 to 11 or any of the Examples described herein may further include, that the processing circuitry is configured to generate and insert forward error correction data for the transmission frame.

In Example 13, the subject matter of example 12 or any of the Examples described herein may further include, that the transmission frame comprises a plurality of sub-frames, wherein the processing circuitry is configured to generate and insert the forward error correction data for each sub-frame based on the data included in the sub-frame.

Example 14 relates to a reception apparatus (50) for decoding a transmission frame transmitted downstream from a source device (400) to a plurality of destination devices (500) via a point to multipoint communication network, the reception apparatus being associated with a destination device of the plurality of destination devices, the reception apparatus comprising processing circuitry (54) configured to obtain a header of the transmission frame, the header comprising, for each destination device, information on a presence of data for the destination device in the transmission frame. The reception apparatus (50) comprises decode a portion of the transmission frame designated for the destination device based on the header of the transmission frame.

In Example 15, the subject matter of example 14 or any of the Examples described herein may further include, that the header of the transmission frame is designated for each of the plurality of destination devices.

In Example 16, the subject matter of one of the examples 14 to 15 or any of the Examples described herein may further include, that the processing circuitry is configured to omit decoding a further portion of the destination device not designated for the destination device.

In Example 17, the subject matter of one of the examples 14 to 16 or any of the Examples described herein may further include, that the processing circuitry is configured to decode at least a portion of the remainder of the transmission frame if the header indicates the presence of data for the destination device.

In Example 18, the subject matter of one of the examples 14 to 17 or any of the Examples described herein may further include, that the header comprises, for each destination device with data present in the transmission frame, information on an offset between the header and the data designated for the destination device, wherein the processing circuitry is configured to decode the portion of the transmission frame according to the information on the offset if the transmission frame comprises data for the destination device.

In Example 19, the subject matter of example 18 or any of the Examples described herein may further include, that the header of the transmission frame comprises headers of data units being included in the transmission frame, the headers of the data units representing the information on the offset between the header of the transmission frame and the data designated for the destination device, the processing circuitry being configured to determine the offset between the header of the transmission frame and the data designated for the destination device based by processing the headers of the data units.

In Example 20, the subject matter of one of the examples 14 to 19 or any of the Examples described herein may further include, that the data included in the transmission frame is encoded using a low-density parity check, LDPC, code, the processing circuitry being configured to decode the low-density parity check coded data.

Example 21 relates to a transmission device (40) for generating a header of a transmission frame to be transmitted downstream from a source device (400) to a plurality of destination devices (500) via a point to multipoint communication network, the transmission device comprising processing means (44) configured to generate the header based on a plurality data units to be transmitted to the destination devices, wherein each data unit is designated to be transmitted to one of the destination devices, wherein the header is generated such, that the header comprises, for each destination device, information on a presence of data for the destination device in the transmission frame associated with the header.

In Example 22, the subject matter of example 11 or any of the Examples described herein may further include, that the header comprises at least a part of a bitmap indicating the presence of data for each of the plurality of destination devices.

In Example 23, the subject matter of example 21 or any of the Examples described herein may further include, that the header comprises, for each destination device with data present in the transmission frame, information on an offset between the header and the data designated for the destination device.

In Example 24, the subject matter of example 23 or any of the Examples described herein may further include, that the processing means is configured to order the data of the plurality of data units such, that for each destination device with data present in the transmission frame, the respective data is grouped together within the transmission frame.

In Example 25, the subject matter of one of the examples 23 to 24 or any of the Examples described herein may further include, that the header comprises, for each destination device with data present in the transmission frame, a field comprising an identifier of the destination device and the information on the offset for the destination device.

In Example 26, the subject matter of one of the examples 23 to 24 or any of the Examples described herein may further include, that each data unit is associated with a data unit header, wherein the header of the transmission frame comprises the headers of the data units, the headers of the data units representing the information on the offset between the header of the transmission frame and the data designated for the destination device.

In Example 27, the subject matter of example 26 or any of the Examples described herein may further include, that the processing means is configured to group the data unit headers within the header of the transmission frame.

In Example 28, the subject matter of example 26 or 27 or any of the Examples described herein may further include, that each data unit header comprises information on the destination device the data unit is designated for and information on a length of the data unit, wherein the offset between the header of the transmission frame and the data designated for the destination device is based on the lengths of the data units specified by the data unit headers.

In Example 29, the subject matter of one of the examples 23 to 28 or any of the Examples described herein may further include, that the transmission frame comprises a plurality of sub-frames, wherein the information on the offset indicates the offset with respect to a sub-frame of the plurality of sub-frames.

In Example 30, the subject matter of one of the examples 21 to 29 or any of the Examples described herein may further include, that the point to multipoint communication network is a passive optical network.

In Example 31, the subject matter of one of the examples 21 to 30 or any of the Examples described herein may further include, that the header of the transmission frame is a framing sublayer header.

In Example 32, the subject matter of one of the examples 21 to 31 or any of the Examples described herein may further include, that the processing means is configured to generate and insert forward error correction data for the transmission frame.

In Example 33, the subject matter of example 32 or any of the Examples described herein may further include, that the transmission frame comprises a plurality of sub-frames, wherein the processing means is configured to generate and insert the forward error correction data for each sub-frame based on the data included in the sub-frame.

Example 34 relates to a reception device (50) for decoding a transmission frame transmitted downstream from a source device (400) to a plurality of destination devices (500) via a point to multipoint communication network, the reception device being associated with a destination device of the plurality of destination devices, the reception device comprising processing means (54) configured to obtain a header of the transmission frame, the header comprising, for each destination device, information on a presence of data for the destination device in the transmission frame. The reception device (50) comprises decode a portion of the transmission frame designated for the destination device based on the header of the transmission frame.

In Example 35, the subject matter of example 34 or any of the Examples described herein may further include, that the header of the transmission frame is designated for each of the plurality of destination devices.

In Example 36, the subject matter of one of the examples 34 to 35 or any of the Examples described herein may further include, that the processing means is configured to omit decoding a further portion of the destination device not designated for the destination device.

In Example 37, the subject matter of one of the examples 34 to 36 or any of the Examples described herein may further include, that the processing means is configured to decode at least a portion of the remainder of the transmission frame if the header indicates the presence of data for the destination device.

In Example 38, the subject matter of one of the examples 34 to 37 or any of the Examples described herein may further include, that the header comprises, for each destination device with data present in the transmission frame, information on an offset between the header and the data designated for the destination device, wherein the processing means is configured to decode the portion of the transmission frame according to the information on the offset if the transmission frame comprises data for the destination device.

In Example 39, the subject matter of example 38 or any of the Examples described herein may further include, that the header of the transmission frame comprises headers of data units being included in the transmission frame, the headers of the data units representing the information on the offset between the header of the transmission frame and the data designated for the destination device, the processing means being configured to determine the offset between the header of the transmission frame and the data designated for the destination device based by processing the headers of the data units.

In Example 40, the subject matter of one of the examples 34 to 39 or any of the Examples described herein may further include, that the data included in the transmission frame is encoded using a low-density parity check, LDPC, code, the processing means being configured to decode the low-density parity check coded data.

Example 41 relates to a transmission method for generating a header of a transmission frame to be transmitted downstream from a source device (400) to a plurality of destination devices (500) via a point to multipoint communication network, the transmission method comprising generating (410) the header based on a plurality data units to be transmitted to the destination devices, wherein each data unit is designated to be transmitted to one of the destination devices, wherein the header is generated such, that the header comprises, for each destination device, information on a presence of data for the destination device in the transmission frame associated with the header.

In Example 42, the subject matter of example 41 or any of the Examples described herein may further include, that the header comprises at least a part of a bitmap indicating the presence of data for each of the plurality of destination devices.

In Example 43, the subject matter of one of the examples 41 to 42 or any of the Examples described herein may further include, that the header comprises, for each destination device with data present in the transmission frame, information on an offset between the header and the data designated for the destination device.

In Example 44, the subject matter of example 43 or any of the Examples described herein may further include, that the method comprises ordering (420) the data of the plurality of data units such, that for each destination device with data present in the transmission frame, the respective data is grouped together within the transmission frame.

In Example 45, the subject matter of one of the examples 43 to 44 or any of the Examples described herein may further include, that the header comprises, for each destination device with data present in the transmission frame, a field comprising an identifier of the destination device and the information on the offset for the destination device.

In Example 46, the subject matter of one of the examples 43 to 44 or any of the Examples described herein may further include, that each data unit is associated with a data unit header, wherein the header of the transmission frame comprises the headers of the data units, the headers of the data units representing the information on the offset between the header of the transmission frame and the data designated for the destination device.

In Example 47, the subject matter of example 46 or any of the Examples described herein may further include, that the method comprises grouping (430) the data unit headers within the header of the transmission frame.

In Example 48, the subject matter of one of the examples 46 to 47 or any of the Examples described herein may further include, that each data unit header comprises information on the destination device the data unit is designated for and information on a length of the data unit, wherein the offset between the header of the transmission frame and the data designated for the destination device is based on the lengths of the data units specified by the data unit headers.

In Example 49, the subject matter of one of the examples 43 to 48 or any of the Examples described herein may further include, that the transmission frame comprises a plurality of sub-frames, wherein the information on the offset indicates the offset with respect to a sub-frame of the plurality of sub-frames.

In Example 50, the subject matter of one of the examples 41 to 49 or any of the Examples described herein may further include, that the point to multipoint communication network is a passive optical network.

In Example 51, the subject matter of one of the examples 41 to 50 or any of the Examples described herein may further include, that the header of the transmission frame is a framing sublayer header.

In Example 52, the subject matter of one of the examples 41 to 51 or any of the Examples described herein may further include, that the method comprises generating (440) and inserting (445) forward error correction data for the transmission frame.

In Example 53, the subject matter of example 52 or any of the Examples described herein may further include, that the transmission frame comprises a plurality of sub-frames, wherein the method comprises generating (440) and inserting (445) the forward error correction data for each sub-frame based on the data included in the sub-frame.

Example 54 relates to a reception method for decoding a transmission frame transmitted downstream from a source device (400) to a plurality of destination devices (500) via a point to multipoint communication network, the reception method being performed by a destination device of the plurality of destination devices, the reception method comprising obtaining (510) a header of the transmission frame, the header comprising, for each destination device, information on a presence of data for the destination device in the transmission frame. The reception method comprises decoding (520) a portion of the transmission frame designated for the destination device based on the header of the transmission frame.

In Example 55, the subject matter of example 54 or any of the Examples described herein may further include, that the header of the transmission frame is designated for each of the plurality of destination devices.

In Example 56, the subject matter of one of the examples 54 to 55 or any of the Examples described herein may further include, that the method comprises omitting (540) decoding a further portion of the destination device not designated for the destination device.

In Example 57, the subject matter of one of the examples 54 to 56 or any of the Examples described herein may further include, that the method comprises decoding (520) at least a portion of the remainder of the transmission frame if the header indicates the presence of data for the destination device.

In Example 58, the subject matter of one of the examples 54 to 57 or any of the Examples described herein may further include, that the header comprises, for each destination device with data present in the transmission frame, information on an offset between the header and the data designated for the destination device, wherein the method comprises decoding (520) the portion of the transmission frame according to the information on the offset if the transmission frame comprises data for the destination device.

In Example 59, the subject matter of example 58 or any of the Examples described herein may further include, that the header of the transmission frame comprises headers of data units being included in the transmission frame, the headers of the data units representing the information on the offset between the header of the transmission frame and the data designated for the destination device, the method comprises determining (530) the offset between the header of the transmission frame and the data designated for the destination device based by processing (535) the headers of the data units.

In Example 60, the subject matter of one of the examples 54 to 59 or any of the Examples described herein may further include, that the data included in the transmission frame is encoded using a low-density parity check, LDPC, code, the method comprising decoding the low-density parity check coded data.

Example 61 relates to a source device (400) comprising the transmission apparatus (40) according to one of the examples 1 to 13.

Example 62 relates to a source device (400) comprising the transmission device (40) according to one of the examples 31 to 43.

Example 63 relates to a source device (400) being configured to perform the transmission method according to one of the examples 51 to 53.

In Example 64, the subject matter of one of the examples 61 to 63 or any of the Examples described herein may further include, that the source device is an optical line terminal.

Example 65 relates to a destination device (500) comprising the reception apparatus (50) according to one of the examples 14 to 20.

Example 66 relates to a destination device (500) comprising the reception device (50) according to one of the examples 34 to 40.

Example 67 relates to a destination device (500) being configured to perform the reception method according to one of the examples 54 to 60.

In Example 68, the subject matter of one of the examples 65 to 67 or any of the Examples described herein may further include, that the destination device is an optical network unit.

Example 69 relates to a passive optical network (1000) comprising the optical line terminal (400) according to example 64 and a plurality of optical network units (500) according to example 68.

Example 70 relates to a machine-readable storage medium including program code, when executed, to cause a machine to perform the method of one of one of the examples 41 to 53 or the method according to one of the examples 54 to 60.

Example 71 relates to a computer program having a program code for performing the method of one of one of the examples 41 to 53 or the method according to one of the examples 54 to 60, when the computer program is executed on a computer, a processor, or a programmable hardware component.

Example 72 relates to a machine-readable storage including machine readable instructions, when executed, to implement a method or realize an apparatus as shown in any example or claimed in any pending claim.

Examples may further be or relate to a computer program having a program code for performing one or more of the above methods, when the computer program is executed on a computer or processor. Steps, operations or processes of various above-described methods may be performed by programmed computers or processors. Examples may also cover program storage devices such as digital data storage media, which are machine, processor or computer readable and encode machine-executable, processor-executable or computer-executable programs of instructions. The instructions perform or cause performing some or all of the acts of the above-described methods. The program storage devices may comprise or be, for instance, digital memories, magnetic storage media such as magnetic disks and magnetic tapes, hard drives, or optically readable digital data storage media. Further examples may also cover computers, processors or control units programmed to perform the acts of the above-described methods or (field) programmable logic arrays ((F)PLAs) or (field) programmable gate arrays ((F)PGAs), programmed to perform the acts of the above-described methods.

The description and drawings merely illustrate the principles of the disclosure. Furthermore, all examples recited herein are principally intended expressly to be only for illustrative purposes to aid the reader in understanding the principles of the disclosure and the concepts contributed by the inventor(s) to furthering the art. All statements herein reciting principles, aspects, and examples of the disclosure, as well as specific examples thereof, are intended to encompass equivalents thereof.

A functional block denoted as "means for . . . " performing a certain function may refer to a circuit that is configured to perform a certain function. Hence, a "means for s.th." may be implemented as a "means configured to or suited for s.th.", such as a device or a circuit configured to or suited for the respective task.

Functions of various elements shown in the figures, including any functional blocks labeled as "means", "means for providing a signal", "means for generating a signal.", etc., may be implemented in the form of dedicated hardware, such as "a signal provider", "a signal processing unit", "a processor", "a controller", etc. as well as hardware capable of executing software in association with appropriate software. When provided by a processor, the functions may be provided by a single dedicated processor, by a single shared processor, or by a plurality of individual processors, some of which or all of which may be shared. However, the term "processor" or "controller" is by far not limited to hardware exclusively capable of executing software, but may include digital signal processor (DSP) hardware, network processor, application specific integrated circuit (ASIC), field programmable gate array (FPGA), read only memory (ROM) for storing software, random access memory (RAM), and non-volatile storage. Other hardware, conventional and/or custom, may also be included.

A block diagram may, for instance, illustrate a high-level circuit diagram implementing the principles of the disclosure. Similarly, a flow chart, a flow diagram, a state transition diagram, a pseudo code, and the like may represent various processes, operations or steps, which may, for instance, be substantially represented in computer readable medium and so executed by a computer or processor, whether or not such computer or processor is explicitly shown. Methods disclosed in the specification or in the claims may be implemented by a device having means for performing each of the respective acts of these methods.

It is to be understood that the disclosure of multiple acts, processes, operations, steps or functions disclosed in the specification or claims may not be construed as to be within the specific order, unless explicitly or implicitly stated otherwise, for instance for technical reasons. Therefore, the disclosure of multiple acts or functions will not limit these to a particular order unless such acts or functions are not interchangeable for technical reasons. Furthermore, in some examples a single act, function, process, operation or step may include or may be broken into multiple sub-acts, -functions, -processes, -operations or -steps, respectively. Such sub acts may be included and part of the disclosure of this single act unless explicitly excluded.

Furthermore, the following claims are hereby incorporated into the detailed description, where each claim may stand on its own as a separate example. While each claim may stand on its own as a separate example, it is to be noted that—although a dependent claim may refer in the claims to a specific combination with one or more other claims—other examples may also include a combination of the dependent claim with the subject matter of each other dependent or independent claim. Such combinations are explicitly proposed herein unless it is stated that a specific combination is not intended. Furthermore, it is intended to include also features of a claim to any other independent claim even if this claim is not directly made dependent to the independent claim.

What is claimed is:

1. A transmission apparatus for generating a header of a transmission frame to be transmitted downstream from a source device to a plurality of destination devices via a point to multipoint communication network, the transmission apparatus comprising processing circuitry configured to:
   generate the header based on a plurality data units to be transmitted to the destination devices, wherein each data unit is designated to be transmitted to one of the destination devices,
   wherein the header is generated such, that the header comprises, for each destination device, information on a presence of data for the destination device in the transmission frame associated with the header.

2. The transmission apparatus according to claim 1, wherein the header comprises at least a part of a bitmap indicating the presence of data for each of the plurality of destination devices.

3. The transmission apparatus according to claim 1, wherein the header comprises, for each destination device with data present in the transmission frame, information on an offset between the header and the data designated for the destination device.

4. The transmission apparatus according to claim 3, wherein the processing circuitry is configured to order the data of the plurality of data units such, that for each destination device with data present in the transmission frame, the respective data is grouped together within the transmission frame.

5. The transmission apparatus according to claim 3, wherein the header comprises, for each destination device with data present in the transmission frame, a field comprising an identifier of the destination device and the information on the offset for the destination device.

6. The transmission apparatus according to claim 3, wherein each data unit is associated with a data unit header, wherein the header of the transmission frame comprises the headers of the data units, the headers of the data units representing the information on the offset between the header of the transmission frame and the data designated for the destination device.

7. The transmission apparatus according to claim 6, wherein the processing circuitry is configured to group the data unit headers within the header of the transmission frame.

8. The transmission apparatus according to claim 6, wherein each data unit header comprises information on the destination device the data unit is designated for and information on a length of the data unit, wherein the offset between the header of the transmission frame and the data designated for the destination device is based on the lengths of the data units specified by the data unit headers.

9. The transmission apparatus according to claim 3, wherein the transmission frame comprises a plurality of sub-frames, wherein the information on the offset indicates the offset with respect to a sub-frame of the plurality of sub-frames.

10. The transmission apparatus according to claim 1, wherein the point to multipoint communication network is a passive optical network.

11. The transmission apparatus according to claim 1, wherein the header of the transmission frame is a framing sublayer header.

12. The transmission apparatus according to claim 1, wherein the processing circuitry is configured to generate and insert forward error correction data for the transmission frame.

13. The transmission apparatus according to claim 12, wherein the transmission frame comprises a plurality of sub-frames, wherein the processing circuitry is configured to generate and insert the forward error correction data for each sub-frame based on the data included in the sub-frame.

14. A reception apparatus for decoding a transmission frame transmitted downstream from a source device to a plurality of destination devices via a point to multipoint communication network, the reception apparatus being associated with a destination device of the plurality of destination devices, the reception apparatus comprising processing circuitry configured to:
   obtain a header of the transmission frame, the header comprising, for each destination device, information on a presence of data for the destination device in the transmission frame; and decode a portion of the transmission frame designated for the destination device based on the header of the transmission frame.

15. The reception apparatus according to claim 14, wherein the header of the transmission frame is designated for each of the plurality of destination devices.

16. The reception apparatus according to claim 14, wherein the processing circuitry is configured to omit decoding a further portion of the destination device not designated for the destination device.

17. The reception apparatus according to claim 14, wherein the processing circuitry is configured to decode at least a portion of the remainder of the transmission frame if the header indicates the presence of data for the destination device.

18. The reception apparatus according to claim 14, wherein the header comprises, for each destination device with data present in the transmission frame, information on an offset between the header and the data designated for the destination device, wherein the processing circuitry is configured to decode the portion of the transmission frame according to the information on the offset if the transmission frame comprises data for the destination device.

19. The reception apparatus according to claim 18, wherein the header of the transmission frame comprises headers of data units being included in the transmission frame, the headers of the data units representing the information on the offset between the header of the transmission frame and the data designated for the destination device, the processing circuitry being configured to determine the offset between the header of the transmission frame and the data designated for the destination device based by processing the headers of the data units.

20. The reception apparatus according to claim 14, wherein the data included in the transmission frame is encoded using a low-density parity check, LDPC, code, the processing circuitry being configured to decode the low-density parity check coded data.

21. A transmission method for generating a header of a transmission frame to be transmitted downstream from a source device to a plurality of destination devices via a point to multipoint communication network, the transmission method comprising:
generating the header based on a plurality data units to be transmitted to the destination devices, wherein each data unit is designated to be transmitted to one of the destination devices,
wherein the header is generated such, that the header comprises, for each destination device, information on a presence of data for the destination device in the transmission frame associated with the header.

22. The transmission method according to claim 21, wherein the point to multipoint communication network is a passive optical network.

23. A reception method for decoding a transmission frame transmitted downstream from a source device to a plurality of destination devices via a point to multipoint communication network, the reception method being performed by a destination device of the plurality of destination devices, the reception method comprising:
obtaining a header of the transmission frame, the header comprising, for each destination device, information on a presence of data for the destination device in the transmission frame; and
decoding a portion of the transmission frame designated for the destination device based on the header of the transmission frame.

24. The reception method according to claim 23, wherein the method comprises omitting decoding a further portion of the destination device not designated for the destination device.

* * * * *